May 3, 1966 W. T. VAN BUSKIRK 3,249,300

RESETTABLE CONTROL DEVICE HAVING ELEMENTS RESET BY USE OF HEARTSHAPED CAMS

Filed Jan. 30, 1963 6 Sheets-Sheet 1

INVENTOR.
WARREN T. VAN BUSKIRK

BY John A. Harvey
ATTORNEY

May 3, 1966 W. T. VAN BUSKIRK 3,249,300

RESETTABLE CONTROL DEVICE HAVING ELEMENTS RESET BY USE OF HEARTSHAPED CAMS

Filed Jan. 30, 1963 6 Sheets-Sheet 3

3,249,300

RESETTABLE CONTROL DEVICE HAVING ELEMENTS RESET BY USE OF HEARTSHAPED CAMS

Warren T. Van Buskirk, Rochester, N.Y., assignor, by mesne assignments, to Friden, Inc., San Leandro, Calif., a corporation of Delaware Filed Jan. 30, 1963, Ser. No. 254,991
3 Claims. (Cl. 235—144)

The present invention relates to resettable devices and, more particularly, to resettable electrical circuit control devices useful with a program selector electrical circuit control device having the construction disclosed in the copending application of Edwin O. Blodgett, Serial No. 254,992, field concurrently herewith, and assigned to the same assignee as the present application.

It is frequently desirable that electrical control circuits be readily and quickly converted from one control circuit configuration to one or more others enabling individual and often quite distinct characteristics of operational control. This may sometimes be accomplished by some form of relatively simple electrical circuit switching, but the more complex circuit conversions often require use of multiple switching control devices individually operable in various orders and combinations according to the particular desired one of plural circuit configurations available.

A typical example of one of these more complex forms of electrical circuit control arrangement requiring extensive yet readily available circuit conversion is disclosed in the copending application of Ben Harris et al., Ser. No. 254,896, filed January 30, 1963, for Data Transmission System, and assigned to the same assignee as the present application. The Harris et al. arrangement relates to a data transmission and collection system having plural available data sources, including a source of manually inserted data, which are used individually or in various combinations according to the nature of the data to be transmitted. This system has extensive application in many forms of business operations such as, for example, in manufacturing plants where machine operators must provide a continuing flow of information to a central location to inform that location of the current status of numerous types of machining, processing and fabrication operations. The data source or complement of data sources used for this purpose by one operator may be different from that used by another, yet by appropriate and readily effected change of electrical control circuit configuration the same available data sources may be employed by various categories of operators for transmission to the central location of various categories of data. Since these transmissions must be accomplished by persons of little skill or training in clerical methods and procedures, it is highly desirable that all required conversions of circuit control configuration be accomplished by operator settings of circuit control devices according to straightforward and clearly defined manipulative procedures.

It is an object of the present invention to provide, as expressed more clearly by the appended claims, a new and improved resettable control device such as a resettable electrical circuit control device which facilitates ready accomplishment of the foregoing enumerated desirable objectives.

Figure 1:
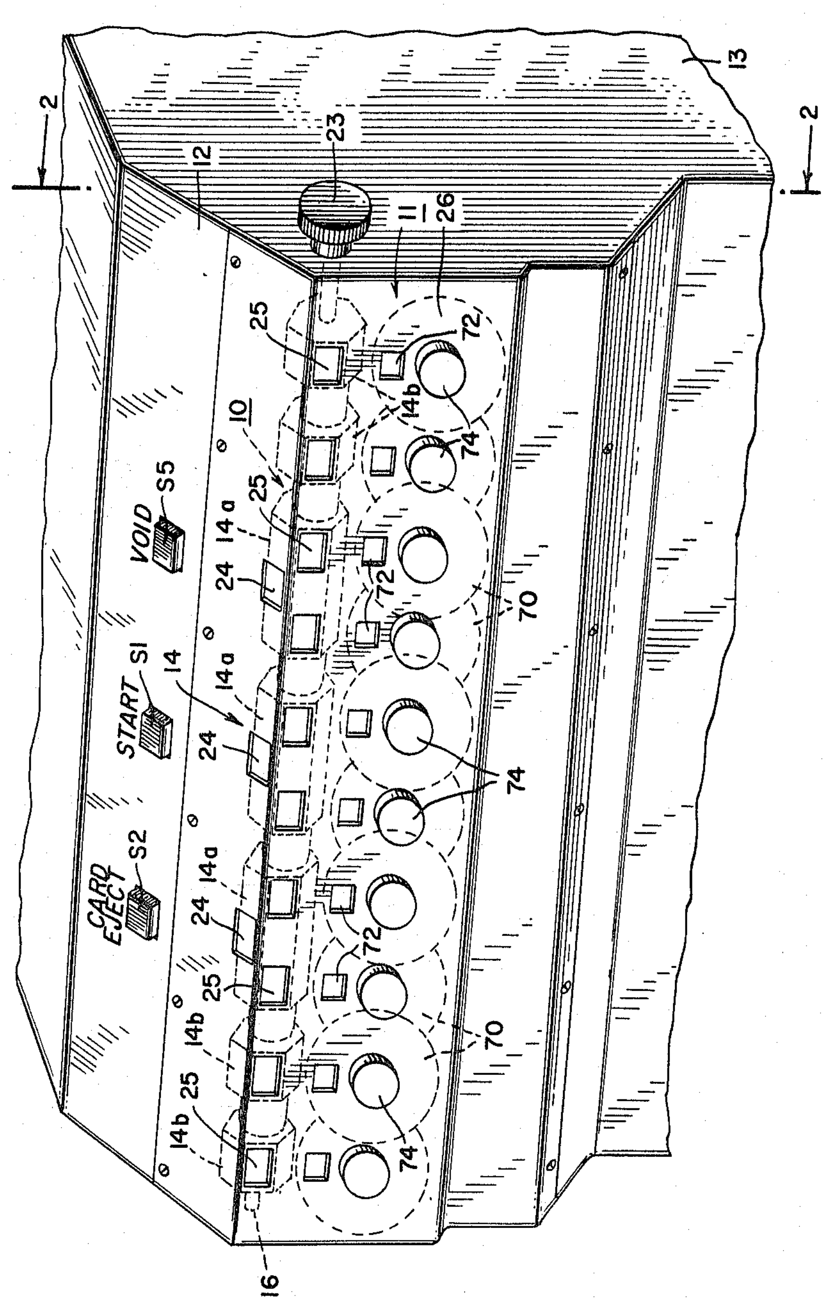
Figure 2:
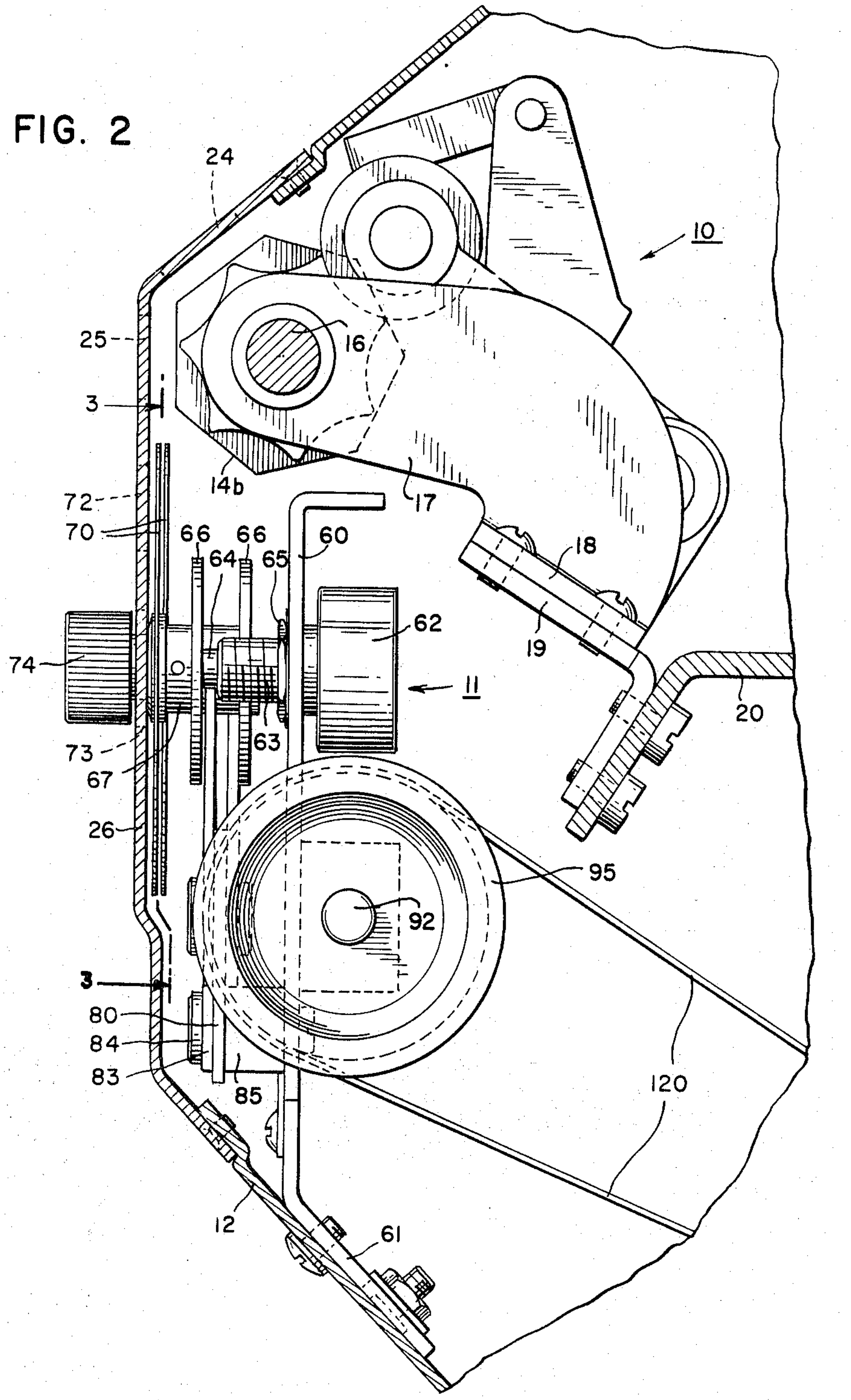
Figures 3, 3B:
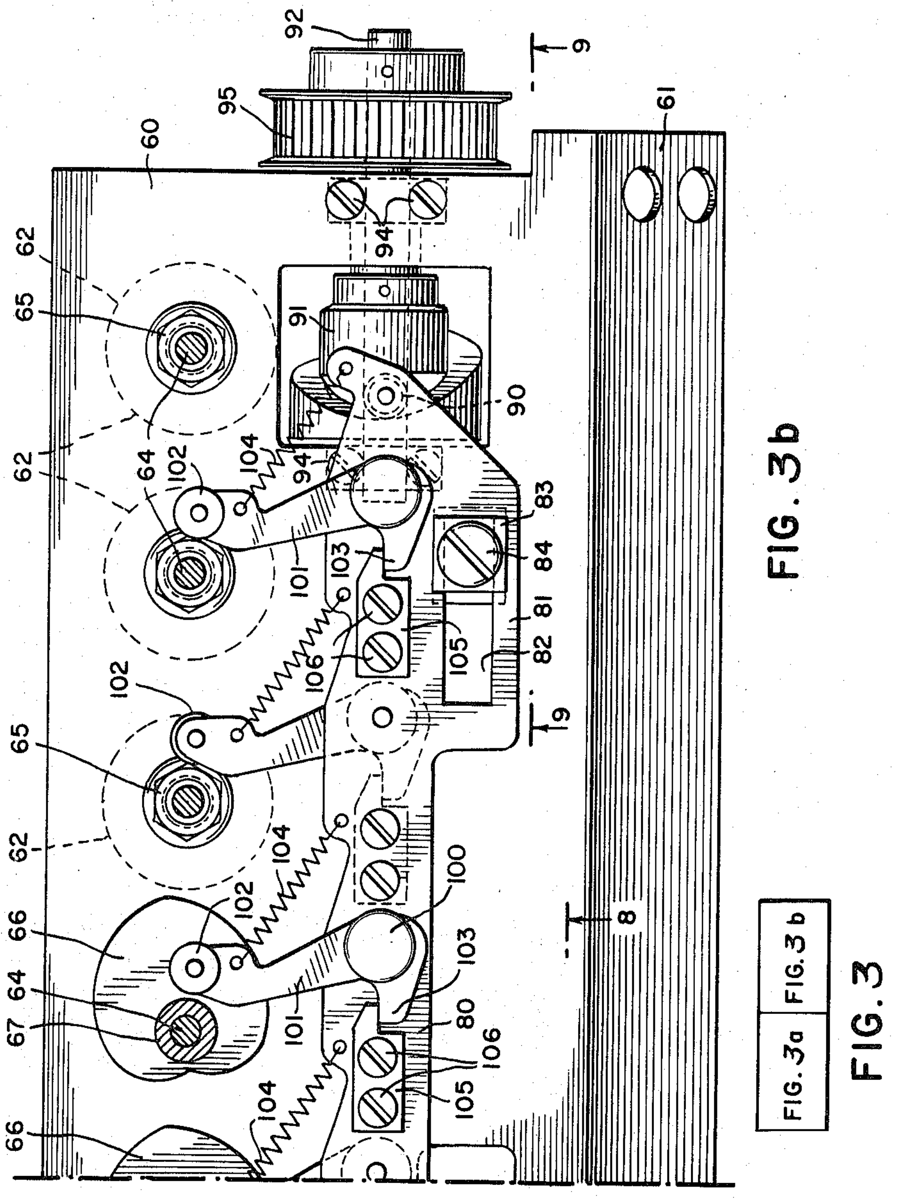
Figure 3A:
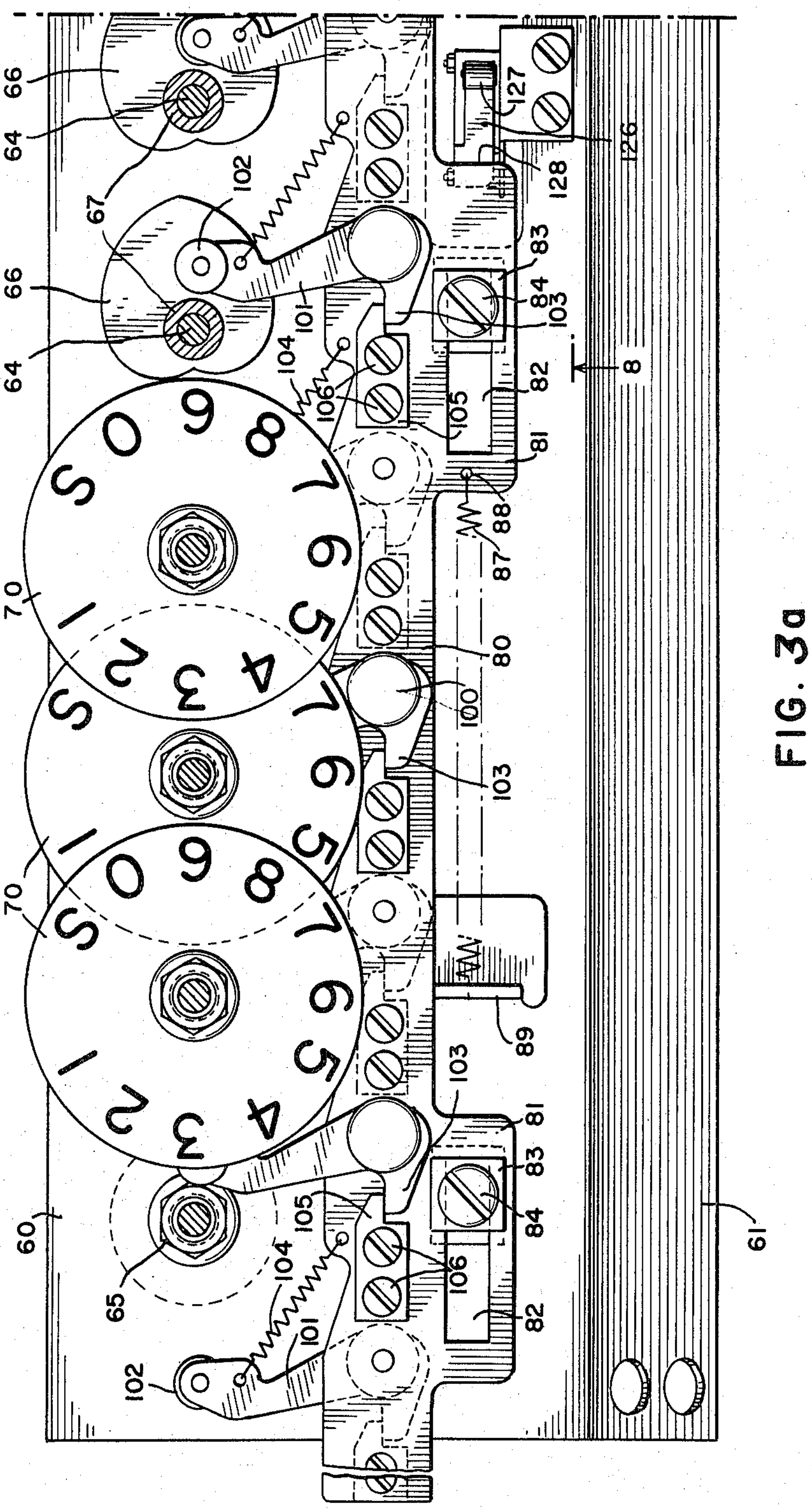
Figures 4, 5:
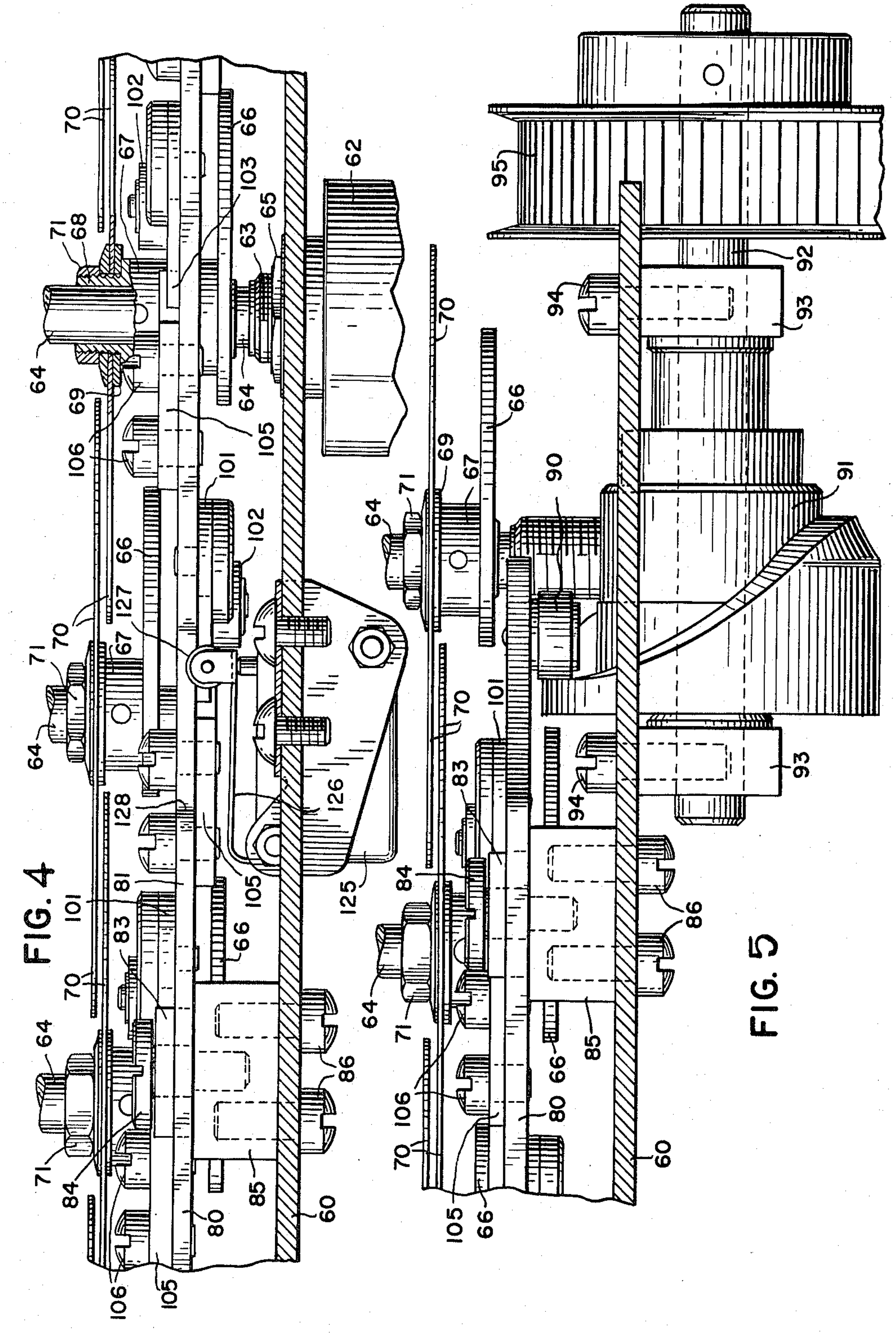
Figures 6, 7, 8:
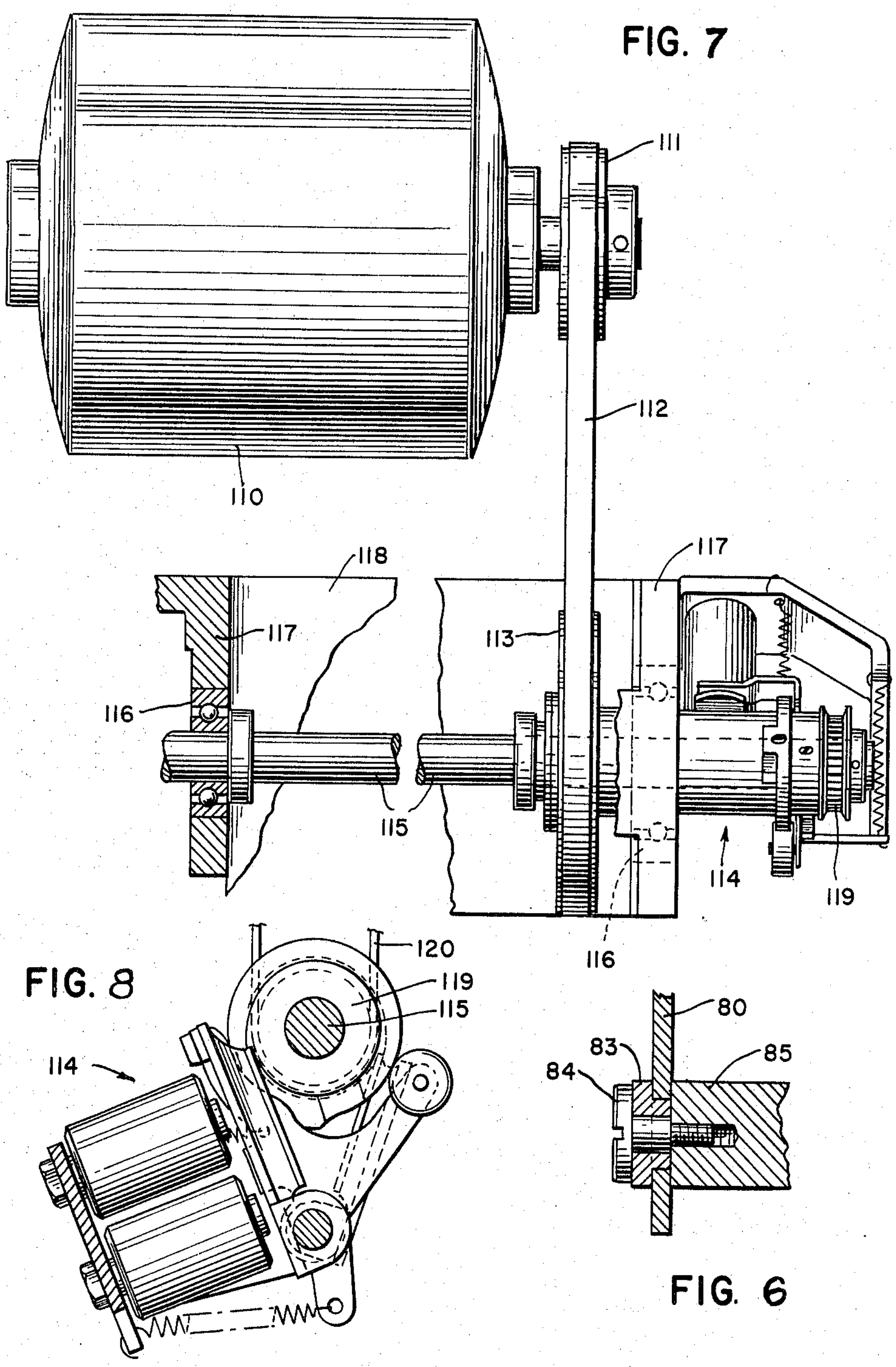

Referring to the drawings forming a part of this application, FIG. 1 illustrates in axonometric view the cooperative arrangement of an electrical circuit control device of the aforementioned Blodgett application (hereinafter referred to for convenience as a program selector device) and a resettable device of the present invention (hereinafter referred to for convenience as a manual data insertion device) enclosed within a horizontally positioned and outwardly projecting portion of an otherwise rectangular enclosing housing or cabinet of which only an upper corner portion is illustrated for simplicity; FIG. 2 is an elevational cross sectional view illustrating in greater particularity the relative arrangement of the resettable device of the present invention within the enclosing cabinet; FIGS. 3*a* and 3*b* arranged as in FIG. 3 illustrate the overall construction of the manual data insertion device; FIGS. 4 and 5 are enlarged fragmentary views illustrating certain constructional details of the latter device, and FIG. 6 is a fragmentary cross-sectional view showing a further constructional detail; and FIGS. 7 and 8 illustrate the construction of a drive arrangement for the manual data insertion device to reset it for further operation.

Referring more particularly to FIG. 1 of the drawings, an electrical circuit control device 10 of the aforementioned Blodgett application is illustrated in cooperative relation with a resettable device 11 of the present invention, both being enclosed within a horizontally positioned and outwardly projecting portion 12 of a metal enclosing housing or cabinet 13 of which only an upper corner portion is shown for simplicity. The cabinet 13 conveniently encloses in addition various circuit components such as a manually operable start switch S1, a card eject switch S2, a void switch S5 and other components (not shown) of an electrical control system such as one form of data transmission system disclosed in the aforementioned Harris et al. copending application.

The construction of the electrical circuit control device 10, comprising a program selector device in conformity with the function which it performs in the aforementioned Harris et al. application, includes an elongated program drum 14 having three spaced, central, elongated, indicia portions **14*a* and shorter spaced pairs of end indicia portions 14*b* all of heptagon cross-sectional configuration. The drum 14 is journalled for axial rotation upon axially projecting end shafts 16 which are received in bearing surfaces in individual end arms 17 (FIG. 2) secured by flanged feet 18 to an elongated support member 19 of L-shaped cross section. The latter is supported at spaced points along its length on stationary brackets 20 suitably mounted within the cabinet 13** by means not shown for simplicity.

The right hand one of the shafts 16 extends through an aperture (not shown) in a side wall of the cabinet projecting portion 12, and has secured on its end a knob 23 which may be manually grasped to rotate the program drum 14 to any of seven angular positions corresponding to the seven sides of the drum indicia bearing portions **14*a* and 14*b*. As shown more clearly in FIG. 2, the drum is positioned at an upper corner of the cabinet projecting portion 12 having front and upper wall surfaces forming an obtuse angle corresponding to that between adjacent faces of the drum indicia portions 14*a* and 14*b***.

The central circumferential surface area of the centermost one of the elongated drum portion **14*a* carry words or other indicia on each of its seven surfaces defining a particular one of seven programs which may be selected by manual rotation of the program drum 14 to each of its seven angular positions. The central circumferential surface areas of the end-most elongated drum portions 14*a* carry words or other indicia indicating certain operational procedures involved in the selected program. All of these centrally positioned words or indicia may be viewed through rectangular apertures 24 provided in the upper wall of the cabinet projecting portion 12. The end-most circumferential surface areas of the drum portions 14*a* and the surface areas of the drum portions 14*b* carry words of instruction or other indicia concerning the manual settings of the electrical circuit control device 11**, presently to be described, in conformity with the selected program. These words or indicia may be viewed through rectangular apertures 25 provided in the front wall of the cabinet projecting portion 12.

The resettable electrical circuit control device 11 shown in FIG. 1, and which as previously mentioned is for convenience of reference hereinafter referred to as a manual data insertion device in conformity with the function which it performs in the aforementioned Harris et al. application, has a construction illustrated in FIGS. 3*a* and 3*b* arranged as in FIG. 3 considered in conjunction with the enlarged fragmentary views of FIGS. 4–6. The device is fabricated upon a panel 60 having a lower flange portion 61 by which the panel is secured to the lower wall surface of the cabinet projecting portion 12 as shown more clearly in FIG. 2. A plurality of rotationally adjustable electrical circuit control devices are each conveniently enclosed within a housing 62 having a centrally projecting and externally threaded sleeve 63 which journals a rotary control shaft 64. These enclosed control devices may, by way of example, be comprised by multi-deck rotary electrical switches having the movable contacts of each switch mechanically connected for unicontrol movement by the control shaft 64. The movable contacts of these switch decks may be included either in individual electrical circuits or a common electrical circuit as desired, and their stationary contacts may be connected in any desired manner; for example, the stationary contacts of several decks may be electrically connected together except for an initial or "home" contact of each, and may have the stationary contacts of additional decks electrically interconnected as between these decks to provide for each of the plural positions to which the switch may be set an individual code-identified electrical output-circuit. Such switch connections are shown in more detail in the aforementioned Harris et al. application.

The panel 60 is provided with a plurality of linearly aligned and spaced apertures through which the sleeves 63 project and threadingly receive nuts 65 fixedly to secure the housings 62 upon the panel 60 with the axes of the control shafts 64 positioned in parallel relation. A heart-shaped reset cam 66 having an integral hub 67 (FIG. 4) is fixedly secured upon each of the control shafts 64, and in the interests of compactness of construction the cams on successive shafts are staggered axially of the shafts to lie in either of two planes (as illustrated more clearly in FIG. 4) so that adjacent cams move into overlapping relation to one another. Each hub 67 has a threaded nose 68 upon which a support disc washer 69 and a dial 70 are secured by a nut 71. Here again in the interests of compactness of construction, the dials 70 of successive control shafts are staggered axially to lie in either of two planes as shown in FIGS. 4 and 5 so that adjacent dials may overlap one another.

The outer peripheral front surface areas of the dials 70 have printed indicia such, for example, as the series of consecutive and equally spaced numerals 0–9 and letter "S" corresponding to the several positional settings of the switch or other circuit control device enclosed within the housing 62. As illustrated more clearly in FIG. 2, the circuit control device 11 is mounted with the dials 70 positioned behind the control panel 26, the indicia of each dial being viewed singly through a rectangular window 72 provided in the front panel 26. The shafts 64 and dial securing nuts 71 of each control device project through an aperture 73 of the control panel 26, and a manually adjustable knob 74 is fixedly secured on the end of each shaft 64 for purposes of adjusting the electrical circuit control devices enclosed within the housing 62. To permit ready removal of the panel 26, the control panel apertures 73 may have a diameter slightly larger than that of the knobs 74 or may have a smaller diameter if the knobs are readily removable from their associated control shafts 64.

The reset cams 66 are secured on their associated shafts 64 in such angular position that the associated control devices enclosed within the housings 62 are reset to a preselected or "home" position when the reset cams 66 occupy the reset angular position shown in FIGS. 3*a* and 3*b*. All of the reset cams 66 are concurrently reset to this reset angular position by a reset structure now to be described. This structure includes an elongated reset bar 80 which is supported for longitudinal reciprocatory motion upon the panel 60. To this end, the bar 80 is provided with longitudinally spaced short skirt portions 81 along its lower edge. The latter have rectangular apertures 82 through which slidably extend parallel-shouldered guide plates 83 secured by machine screws 84 to supporting blocks 85 fastened by machine screws 86 to the panel 60 as indicated by FIGS. 4 and 5 and the fragmentary cross-sectional view of FIG. 6. The reset bar 80 is normally biased to its non-reset position by a helical wire spring 87 having one end anchored in an aperture 88 of the central skirt portion 81 and its other end anchored in an aperture of an upstanding short flange 89 struck out from the material of the panel 60. Longitudinal reciprocation of the reset bar 80 between its reset and non-reset positions is effected by engagement of a cam follower roller 90, pivotally supported on the reset bar 80, and the cylindrical cam surface of a cam member 91 fixedly secured to and rotationally supported by a shaft 92 journaled by bearing blocks 93 secured by machine screws 94 to the panel 60. The cam member 91 and shaft 92 are axially positioned by engagement of the ends of the cam member 91 with the bearing blocks 93, and a drive pulley 95 is secured on the end of the shaft 92 as shown.

Spaced longitudinally along the length of the reset bar 80, and pivotally secured thereto by enlarged-head studs 100, are a plurality of cam reset arms 101. One such reset arm 101 is provided for each of the reset cams 66, and alternating ones of the reset arms are mounted on opposite sides of the reset bar 80 so that a reset roller 102 pivotally mounted on the remote end of each arm is in alignment with the median plane of an associated one of the reset cams 66. Each of the reset arms 101 has a short projecting foot portion 103 which is biased by an associated helical wire spring 104, anchored between the reset arm 101 and the reset bar 80 as shown in FIGS. 3*a* and 3*b*, into engagement with a stop block 105 secured by machine screws 106 to the reset bar 80. Upon longitudinal movement of the reset bar 80 from its non-reset position to its reset position as effected by driven rotation of the cam member 91, the reset arms 101 move linearly in unison with the reset bar. During this movement, the cam roller 102 of each reset arm engages its associated cam 66 and rotates the latter to its reset position shown in FIGS. 3*a* and 3*b* at which position each roller 102 makes line contact with its associated cam 66 at two regions on the latter equally spaced from a plane which includes the axes of the roller and cam. The springs 104 provide sufficient tension that the foot portion 103 of each reset arm normally remains in engagement with its associated stop block 105 throughout the reset operation. Assume, however, that during the reset movement a cam roller 102 should exactly engage the apex of its associated cam 66 and thus become temporarily immobile by reason of its inability immediately to rotate the latter in one direction or the other. Continued movement of the reset bar 80 towards its reset position will cause the reset arm which carries the temporarily immobile reset roller to pivot about its stud 100, thus elongating the spring 104, associated with this reset arm. The resultant angular rotation of the reset arm pulls its reset roller 102 off of the apex of the associated cam 66, whereupon the reset roller is no longer held immobile and the tensioned spring 104 now accelerates the return of the reset arm to its normal position where its foot portion 103 engages its associated stop block 105.

Upon completion of movement of the reset bar 80 to its reset position, at which time all of the cams 66 have been restored to their reset position established by engagement of the reset arm rollers 102 with points on the peripheral surface of the associated cams 66 equally spaced from the crotch of the cam, continued rotation of the cam member 91 permits the spring 87 to return the reset bar 80 to its non-reset position. In the non-reset position of the reset bar 80, the reset rollers are spaced from and permit unrestricted rotation of their associated reset cams.

Power drive for the pulley 95 is furnished by an electric motor and jack-shaft arrangement shown in FIGS. 7 and 8. For this purpose, an electric motor 110 has a pulley 111 mechanically connected by a belt 112 to a pulley 113 fixedly secured upon one longitudinally extended clutch element of a 360° helical wire spring clutch 114 which may have the general construction shown and described in the Blodgett U.S. Patent No. 2,927,158. The clutch 114 is positioned upon one end of a jack-shaft 115 which with the clutch 114 is journalled by roller bearings 116 in opposed pedestals 117 of a base casting 118. This casting and the motor 110 are suitably mounted in fixedly spaced relation within the cabinet 13 by means not shown for simplicity. Secured to the end of the jack-shaft 115 is a pulley 119 which is mechanically connected by a belt 120 to the pulley 95 shown in FIGS. 2, 3*b* and 5.

A conventional type of motor 110 usually is designed to operate at a much higher rotational velocity than is desired for rotation of the reset cam member 91, and the diameters of the pulleys 95, 111, 113 and 119 are selected to accomplish a desired over-all ratio of speed reduction. To avoid belt slippage, particularly between the pulleys 95 and 119 for reasons which will presently become apparent, the belts 112 and 120 while not so shown for simplicity are preferably of the conventional transverse ribbed type and the surfaces of the several pulleys are transversely grooved to receive the belt ribs as illustrated for the pulleys 95 and 119. It is convenient to provide a two-to-one speed reduction between the pulley 119 and the pulley 95 so that the jack-shaft 115 makes two complete revolutions for each revolution of the pulley 95. This has the advantage that the clutch 114 more accurately establishes the halt position of the cam member 91 and thus the non-reset and reset positions of the reset bar 80, but requires that each reset cycle of operation be accompanied by an initial and a mid-reset-cycle energization of the clutch magnets to initiate two successive 360° operating cycles of the clutch. The initial such energization is accomplished in any desired manner when a reset operaton is desired, and the mid-reset-cycle energization of the clutch magnets is accomplished by energization of the clutch magnets through a switch 125 (FIG. 4) secured upon the panel 60. The switch 125 has normally-open switch contacts which are operated to closed-contact position by an actuating arm 126 when a roller 127, rotatably supported on the arm 126 and normally positioned to one side of the adjacent edge 128 of the central skirt portion 81, is engaged and moved clockwise (as seen in FIG. 4) by the skirt portion 81 as the reset bar 80 almost completes its longitudinal movement to its reset position.

The general operations of the program selector device 10 and manual data insertion device 11, and their cooperative relationship will now be considered. Assume in this regard that the program drum 14 of the program selector device 10 is manually rotated to one of its seven positions. Assume further that the present structures are utilized in a data transmission system of the type shown in the above-mentioned Harris et al. application, and particularly that a factory machine operator is to make a data transmission concerning a machine boring operation performed by him and that the transmission requires manual insertion of data by the operator.

In preparation for the transmission, the operator would select the program by manual manipulation of the knob 23 (FIG. 1) to rotate the program drum 14 until the word "BORE" appears in the central one of the cabinet apertures or windows 24. Assume that there appears in the left-most four of the apertures or windows 25 the words "MOVE TO," thereby to inform the operator that he should manually manipulate the four knobs 74 immediately below these windows manually to insert four numeric data digits indicating the number of the department or station to which his partially fabricated parts were to be next transferred for the next fabrication operation. In the fifth to eighth aperture or window 25 from the left, there might appear the word "PIECES" to indicate to the operator that he should manipulate the four knobs 74 below these windows and insert four numeric data digits indicating the total number of parts upon which his boring operation had been performed. In the ninth and tenth apertures 25 from the left, there might appear the respective words "NO. REJ,CT." and "NO. SCRAP" to inform the operator that he should manipulate the knobs 74 immediately below these windows to insert numeric data digits indicating the number of parts which were respectively rejected and scrapped resulting from supervisory inspection upon completion of his operations.

The selection of a program drum position in the manner just explained effects operation of an individual pair of electrical contact stacks more fully described in the aforementioned Blodgett application and these accomplish appropriate preliminary checks to insure correct settings of the manual data insertion device 11. Transmissions are then initiated upon operator actuation of the start switch S1 as more fully disclosed and explained in the aforementioned Harris et al. application.

While a specific form of the invention has been described for purposes of illustration, it is contemplated that numerous changes may be made without departing from the spirit of the invention.

What is claimed is:

1. A resettable device comprising a support member, a plurality of rotatable elements supported in spaced alignment on said member with parallel axes of rotation, a heart-shaped cam member individual to each of said elements and rotatable therewith, an elongated reset member supported for reciprocal motion on said support member, a plurality of cam levers pivotally supported at one end on said reset member in individual longitudinally spaced positions with the free ends of said levers in engageable relation to individual ones of said cam members, means for resiliently biasing said reset levers to a static angular position on said reset member while permitting pivotal displacement of each lever upon engagement with an associated cam member wherein the cam member is initially unable to rotate, and means for moving said reset member through a reciprocal cycle to effect by engagement of said cam follower means and cam members concurrent reset of all of said elements to a preselected angular rotational position of each thereof.

2. A resettable device comprising a support member, a plurality of rotatable elements supported in spaced relation on said member with parallel axes of rotation, a heart-shaped cam member individual to each of said elements and rotatable therewith, a reset member supported for reciprocal motion on said support member, a plurality of cam reset rollers rotatably supported at the ends of individual ones of plural arms pivotally supported on said reset member in individual spaced positions thereon to engage said rollers with individual ones of said cam members for movements thereof to reset positions at which a plane which includes the axis of rotation of an individual roller and the axis of rotation of the individual cam member engaged thereby is substantially parallel to the direction of reciprocal movement of said reset member, means for resiliently biasing said arms to a static angular position on said reset member while permitting pivotal displacement of each arm upon engagement of its roller with a non-rotatable associated cam member, and means for moving said reset member through a reciprocal cycle to effect by engagements of said cam reset rollers and cam members concurrent reset of all of said elements to a preselected angular rotational position of each thereof.

3. A resettable device comprising a support member, a plurality of rotatable elements supported in relatively closely spaced relation on said member with parallel axes of rotation, a heart-shaped cam member individual to each of said elements and rotatable therewith, said cam members being axially positioned on said elements in alternately staggered relation permitting movements of adjacent cam members into overlapping relation with one another, a reset member supported for reciprocal motion on said support member, a plurality of cam reset rollers rotatably supported at the ends of individual ones of plural arms pivotally supported in alternately staggered relation on opposite sides of said reset member in individual spaced positions thereon to engage said rollers with individual ones of said cam members for movements thereof to reset positions at which a plane which includes the axis of rotation of an individual roller and the axis of rotation of the individual cam member engaged thereby is substantially parallel to the direction of reciprocal movement of said reset member, means for resiliently biasing each of said arms to a static angular position on said reset member while permitting pivotal displacement of said each arm upon engagement of its roller with a non-rotatable associated cam member, and means for moving said reset member through a reciprocal cycle to effect by engagements of said cam reset rollers and cam members concurrent reset of all of said elements to a preselected angular rotational position of each thereof.

References Cited by the Examiner

UNITED STATES PATENTS

| | | | |
|---|---|---|---|
| 974,006 | 10/1910 | Werle | 235—144 |
| 1,148,516 | 8/1915 | Irion et al. | 235—144 |
| 1,875,518 | 9/1932 | Steinmann | 235—144 |
| 3,092,318 | 6/1963 | Ham | 235—144 |

FOREIGN PATENTS

| | | |
|---|---|---|
| 1,140,000 | 11/1962 | Germany. |

References Cited by the Applicant

UNITED STATES PATENTS

| | | |
|---|---|---|
| 130,244 | 8/1872 | Robjohn. |
| 519,180 | 5/1894 | Gearhart. |

KATHLEEN H. CLAFFY, *Primary Examiner.*

ROBERT K. SCHAEFER, *Examiner.*

BERNARD A. GILHEANY, WILLIAM C. GARVERT, *Assistant Examiners.*